(12) United States Patent
Rudin et al.

(10) Patent No.: US 11,669,341 B2
(45) Date of Patent: Jun. 6, 2023

(54) SECONDARY ACCOUNT CREATION

(71) Applicant: Meta Platforms, Inc., Menlo Park, CA (US)

(72) Inventors: Matthew Rudin, San Francisco, CA (US); Xiqi Liu, Mountain View, CA (US); Borja Moreno-Fernandez, Redwood City, CA (US); John Cotant Christensen, Menlo Park, CA (US)

( * ) Notice: Subject to any disclaimer, the term of this patent is extended or adjusted under 35 U.S.C. 154(b) by 137 days.

(21) Appl. No.: 16/896,791

(22) Filed: Jun. 9, 2020

(65) Prior Publication Data

US 2021/0382724 A1    Dec. 9, 2021

(51) Int. Cl.
| | | |
|---|---|---|
| G06F 9/445 | (2018.01) | |
| G06F 16/9536 | (2019.01) | |
| G06Q 50/00 | (2012.01) | |
| H04L 67/306 | (2022.01) | |
| H04L 51/42 | (2022.01) | |

(52) U.S. Cl.
CPC ........ G06F 9/4451 (2013.01); G06F 16/9536 (2019.01); G06Q 50/01 (2013.01); H04L 51/42 (2022.05); H04L 67/306 (2013.01)

(58) Field of Classification Search
None
See application file for complete search history.

(56) References Cited

U.S. PATENT DOCUMENTS

| | | |
|---|---|---|
| D183,256 S | 7/1958 | Green |
| D195,252 S | 5/1963 | Nikolich |
| D546,334 S | 7/2007 | Seo et al. |
| D574,391 S | 8/2008 | Kwag |
| D603,421 S | 11/2009 | Ebeling et al. |
| D604,325 S | 11/2009 | Ebeling et al. |
| D612,861 S | 3/2010 | Lee |
| D650,790 S | 12/2011 | Jeans et al. |
| D667,423 S | 9/2012 | Nagamine |
| D669,486 S | 10/2012 | Garn et al. |
| D675,229 S | 1/2013 | Frost et al. |
| D676,671 S | 2/2013 | Lee |

(Continued)

OTHER PUBLICATIONS

"How to Create and Manage Multiple Twitter Accounts" by Lance Whitney Retrieved from: https://uk.pcmag.com/gallery/119412/how-to-create-and-manage-multiple-twitter-accounts?p=1#:~:text=Open%20the%20app%20and%20sign,as%20much%20as%20you%20want. (Year: 2019).*

(Continued)

*Primary Examiner* — Tonia L Dollinger
*Assistant Examiner* — Ishrat Rashid
(74) *Attorney, Agent, or Firm* — Lee & Hayes, P.C.

(57) ABSTRACT

Techniques are described that enable a user to create a secondary user account on a social networking system that shares a unique identifier with a primary user account. In some cases, a social networking system receives a first request to create a first user account, where the first request comprises a unique identifier such as a phone number or email address associated with a user. The social networking system creates the first user account associated with the unique identifier. The social networking system then receives a second request to create a second user account, where the second request also comprises the unique identifier associated with the user. The social networking system creates the second user account associated with the unique identifier.

20 Claims, 8 Drawing Sheets

(56) References Cited

U.S. PATENT DOCUMENTS

| | | | |
|---|---|---|---|
| D697,931 | S | 1/2014 | Lee et al. |
| D697,932 | S | 1/2014 | Lee et al. |
| D697,939 | S | 1/2014 | Lee et al. |
| D725,666 | S | 3/2015 | Tseng et al. |
| D740,314 | S | 10/2015 | Oh et al. |
| D755,847 | S | 5/2016 | Butcher et al. |
| D765,728 | S | 9/2016 | Hung |
| D785,027 | S | 4/2017 | Dye et al. |
| 9,681,099 | B1 | 6/2017 | Deets, Jr. |
| D798,893 | S | 10/2017 | Anzures et al. |
| D819,658 | S | 6/2018 | Han et al. |
| D831,673 | S | 10/2018 | O'Rourke et al. |
| D831,689 | S | 10/2018 | Matas |
| D845,992 | S | 4/2019 | Davis et al. |
| 2008/0256602 | A1 | 10/2008 | Pagan |
| 2009/0030985 | A1 | 1/2009 | Yuan |
| 2011/0213975 | A1 | 9/2011 | Sorniotti et al. |
| 2013/0007149 | A1 | 1/2013 | Harris |
| 2013/0125026 | A1 | 5/2013 | Gaume |
| 2015/0264094 | A1 | 9/2015 | Huang et al. |
| 2016/0057154 | A1 | 2/2016 | Ferguson et al. |
| 2016/0253710 | A1 | 9/2016 | Publicover et al. |
| 2018/0336644 | A1* | 11/2018 | Albertine ............ H04L 67/20 |
| 2018/0348966 | A1 | 12/2018 | Scoville et al. |
| 2019/0310882 | A1* | 10/2019 | Wei ................ G06F 9/4881 |
| 2020/0334747 | A1* | 10/2020 | Taylor ............. G06Q 40/025 |

OTHER PUBLICATIONS

Office Action for U.S. Appl. No. 29/738,690, dated Feb. 8, 2022, Berkas, "Display Screen Having a Graphical User Interface or Portion Thereof", 6 pages.

Office Action for U.S. Appl. No. 16/905,823, dated Mar. 15, 2022, Berkas, "Secret User Account", 10 pages.

"Star Icons Twinkling Stars," Alamy, Sep. 2018, 1 page, Retrieved from Internet: URL: https://www.alamy.com/star-icons-twinkling-stars-sparkles-shining-burst-christmas-vector-symbols-isolated-xmas-sparkle-star-asterisk-pointed-twinkling-silhouette-illustration-image357379752.html.

"White Twinkling Vector Stars," Alamy, Sep. 2016, 1 page, Retrieved from Internet: URL: https://www.alamy.com/white-twinkling-vector-stars-isolated-on-dark-background-shining-glitter-star-icons-set-illustration-image344368038.html?p=124%E2%80%A6.

"Shining Stars Animated Black Background Effect," 2016, 1 page, Retrieved from Internet: URL: https://www.youtube.com/watch?v=K_SEBswY5ys&list=PL4tYmy08nAUuzo1kaRmm-kP8le1gR3zCQ&index=65, on Sep. 23, 2021, 1 page.

"Sparkle Glitter #1—4K Green screen," ANFX, 2017, 1 page, Retrieved from Internet: URL: https://www.youtube.com/watch?v=bt0aP5XJRGg&list=PL4tYmy08nAUuzo1kaRmm-kP8le1gR3zCQ&index=13, on Sep. 23, 2021, 1 page.

\* cited by examiner

SECONDARY ACCOUNT CREATION

BACKGROUND

Social networking systems allow users to connect with each other by sharing events, sharing content such as photos and videos, and sharing interests. Users are continually searching for ways to express themselves, and connect with communities of other users having similar interests. Therefore, social networking systems continue to provide users with increasing options for content sharing that allow users to connect with one another. For instance, users may want to create more than one account on a social networking system to share information about an interest, a child, a pet, a business, or the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
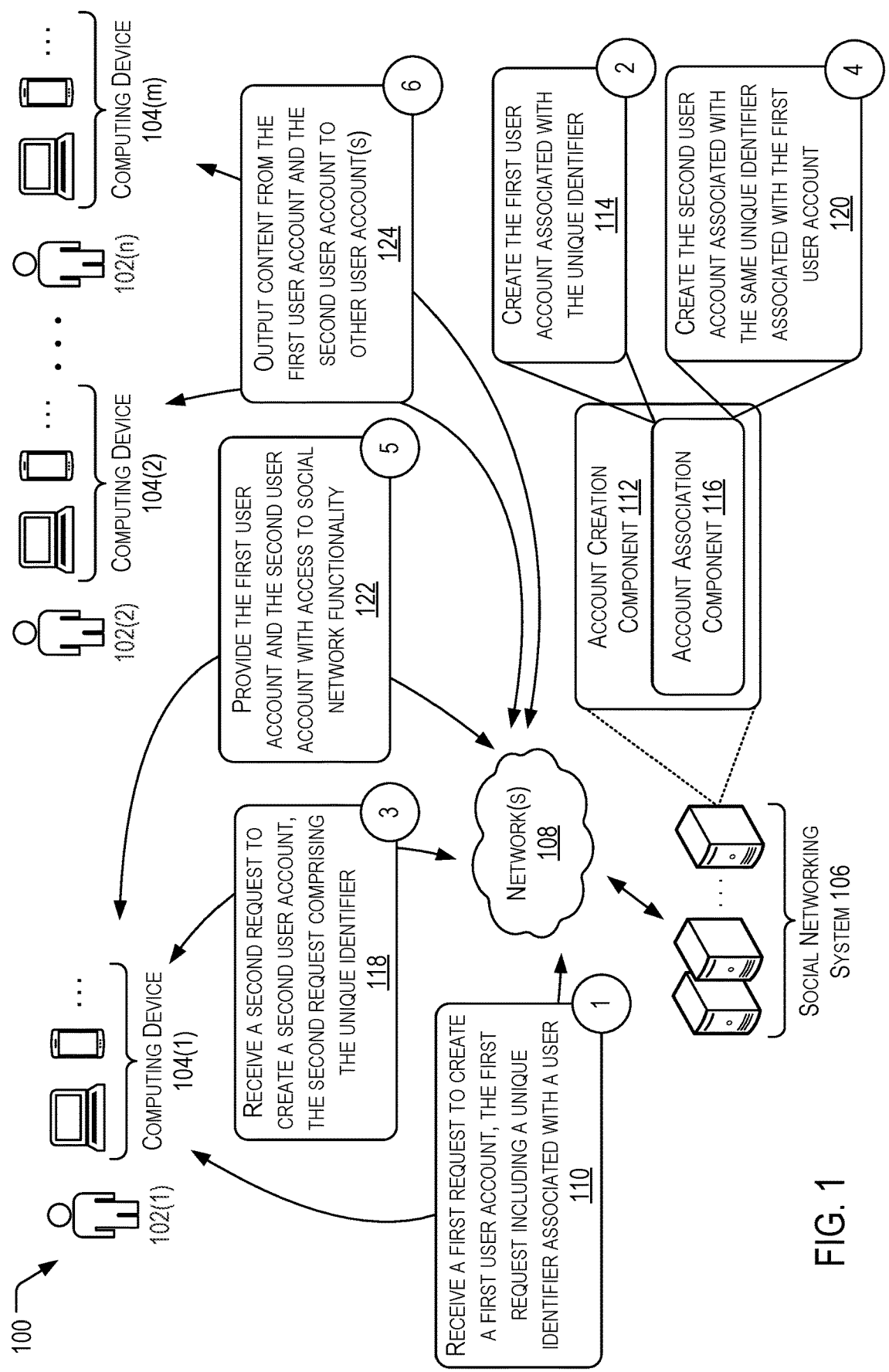
FIG. 1 is a schematic view of an example system usable to implement example techniques for secondary account creation on a social networking system described herein.

As discussed above, social networking systems continue to develop fun and unique ways for users to connect with each other, such as based on shared interests of different users. In some cases, users may want to create more than one account on a social networking system to share information about an interest, a child, a pet, a business, or the like. However, conventional systems often require a user to provide a unique identifier, such as a phone number or email address, each time the user wants to create a different account.

Some users attempt to solve this problem by creating a new email account, for example, with the creation of each new account on the social networking system. However, management of multiple email accounts can become burdensome and frustrating for users, who must go through the steps of creating a new email account for each account on a social networking system, and remember which email account is associated with which account on the social networking system. Alternatively, some users attempt to solve this problem by making up fake unique identifiers. This can lead to problems such as messages intended for the user who created an account on the social networking system being sent to a different user who is, in fact, associated with the made-up unique identifier, and the user who created the account on the social networking system not receiving messages intended for the user who created the account.

This application describes techniques for creating a secondary account on a social networking system and/or service (herein referred to as a "social networking system"), and associating the secondary account with a same unique identifier that is associated with a primary account. By associating secondary account(s) with a single unique identifier, users no longer need to create multiple email accounts or phone numbers, or make up fake email accounts or phone numbers, to create a secondary account on the social networking system. Additionally, by using a same unique identifier, the process of creating second and subsequent accounts can be simplified relative to the process of creating a first account with the social networking system or service. As used herein, "secondary account" refers to any user account created by a user associated with a unique identifier that was created subsequent to another user account associated with the unique identifier.

Various embodiments of the present disclosure include systems, methods, and non-transitory computer-readable media of or used to access a social networking system.

For instance, in one example, a social networking system may operate a service that corresponds to a dedicated application installed on a user device or an application that is accessible via a browser installed on the user device. The social networking system may enable users to share content via the application. In some cases, the shared content may be accessed (e.g., viewed) by devices associated with other users that also have the application installed on, or that access the application via, their respective devices. The social networking system may store account information associated with each user and the respective device on which the application is installed or which is used to access the application.

In some examples, the social networking system may receive a first request to create a first user account, where the first request comprises a unique identifier associated with the user. For instance, the unique identifier may be a name, email address, phone number, driver's license number, mailing address, internet protocol (IP) address, or the like. The social networking system creates the first user account associated with the unique identifier. In some examples, the social networking system receives a second request to create a second user account, where the second request also comprises the unique identifier that is associated with the first user account. The social networking system may create the second user account associated with the unique identifier, such that both the first user account and the second user account are associated with the unique identifier. In some examples, creation of the second user account may include fewer steps, require less information, and/or be otherwise streamlined relative to the process of creating the first user account associated with the unique identifier.

In some examples, as mentioned above, the unique identifier is one or more of a phone number associated with a user or an email address associated with the user.

In some examples, the first user account has a first username and the second user account has a second username, where the first username is different from the second username In this way, the user that created the first user account and the second user account can determine which user account they are interacting with, and other users can differentiate activity by the two (or more) user accounts as well.

In some examples, creating the second user account comprises receiving a selection of a content item from the first user account to copy to the second user account, such as a feed post, a story, a profile picture, a collection, and the like.

In some examples, creating the second user account comprises receiving a selection of a third user account followed by the first user account to also be followed by the second user account, where the third user account is not associated with the unique identifier.

In some examples, the social networking system further determines an amount of interaction by the first user account with the social networking system over a predetermined time period, such as a number of shared content items, a number of times the first user account has provided feedback (e.g., likes, comments, etc.) on content items shared by other user accounts, and the like. The social networking system may determine that the amount of interaction is less than a threshold amount of interaction, and based on this determination, the social networking system may provide a suggestion to the first user account to create the second user account. In examples, the social networking system receiving the second request to create the second user account is based at least in part on selection of a control included in the suggestion.

In some examples, the social networking system further determines a number of user accounts that follow the first user account on the social networking system. The social networking system may determine that the number of user accounts that follow the first user account is greater than a threshold number of user accounts, and based on this determination, the social networking system may provide a suggestion to the first user account to create the second user account. In examples, the social networking system receiving the second request to create the second user account is based at least in part on selection of a control included in the suggestion.

In some examples, the social networking system further determines a tag used by the first user account on the social networking system. The social networking system may determine that the tag has been used by the first user account less than a threshold number of times, and based on this determination, the social networking system may provide a suggestion to the first user account to create the second user account. In examples, the social networking system receiving the second request to create the second user account is based at least in part on selection of a control included in the suggestion.

In this way, the social networking system provides users with the ability to create a secondary user account using a unique identifier that is shared with a previously-created user account. For instance, social networking system enables a user to create a secondary user account using a same email address, phone number, or other unique identifier for the user that was used for another user account previously created by the user on the social networking system.

These and other aspects are described further below with reference to the accompanying drawings. The drawings are merely an example implementation and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to facilitate creation of a secondary account for a social networking system on an application via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 one or more user accounts associated with the user. The user account(s) may include demographic information, communication-channel information, financial information and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to facilitate creation of secondary accounts by the users 102 via the computing devices 104.

For example, at operation 110 (indicated by "1"), an account creation component 112 of the social networking system 106 may receive a first request to create a first user account on the social networking system 106. The first request may include a unique identifier associated with the user 102(1). In some examples, the account creation component 112 may be part of a social network service (e.g., Facebook®, Instagram®, etc.), although other examples of services are also considered. In some cases, the unique identifier may be one or more of a name, email address, phone number, driver's license number, mailing address, internet protocol (IP) address, or the like that identifies the user 102(1) in some way, and differentiates the user 102(1) from other users 102(2)-102(n). The first request may also include a username to associate with the first user account that identifies activities (e.g., posts, comments, likes, etc.) performed by the user 102(1) on the social networking system 106 using the first user account.

At operation 114 (indicated by "2"), the account creation component of the social networking system 106 creates the first user account associated with the unique identifier. Additionally, in examples, an account association component 116 of the account creation component 112 associates the unique identifier with the first user account. In an illustrative example, the account association component 116 associates a unique identifier, such as an email address, included in the request with the first user account. The account association component 116 may also, in some cases, send a verification email to the email address included in the first request that verifies that the first user account has been successfully created.

At operation 118 (indicated by "3"), the account creation component 112 receives a second request to create a second user account, where the second request also comprises the unique identifier that is associated with the first user account. For example, the second request includes a same name, email address, phone number, driver's license number, mailing address, internet protocol (IP) address, or the like that identifies the user 102(1) in some way, and differentiates the user 102(1) from other users 102(2)-102(n), that was included in the first request. The second request may also include a username to associate with the second user account that identifies activities (e.g., posts, comments, likes, etc.) performed by the user 102(1) on the social networking system 106 using the second user account. In examples, the username associated with the second user account may be different from the username associated with the first user account. For instance, having different usernames for different user accounts allows the users 102(2)-102(n) to determine which activities are performed by the different user accounts, such as posts, comments, likes, or other activities on the social networking system 106.

In some cases, the second request may be received from the user 102(1) based on selection of a control provided in a suggestion by the account creation component 112 to create the second user account. For instance, the account creation component 112 may determine activities by the first user account that indicate that the user 102(1) is likely to create a second user account on the social networking system 106. Examples of activities may include an amount of interaction by the first user account with the social networking system 106 over a predetermined time period (e.g., one day, one week, one month, etc.), a number of user accounts that follow the first user account, tags used by the first user account, and so on. The activities may be compared to respective thresholds to determine whether to provide a suggestion to the first user account to create a second user account. The suggestion may include a control that, when selected, causes the account creation component 112 to direct the user 102(1) through the account creation process for creating a second user account. Additional details regarding activities that may prompt a suggestion to create a second user account can be found in relation to FIGS. 5-7.

At operation 120 (indicated by "4"), the account creation component 112 creates the second user account associated with the same unique identifier that was associated with the first user account. Continuing with the illustrative example above, the account association component 116 associates the unique identifier of the email address with the second user account to accompany the first user account associated with the email address. The account association component 116 may also, in some cases, send a verification email to the email address included in the second request that verifies that the second user account has been successfully created.

In some examples, the account association component 116 may determine that the request to create the second user account includes the identifier that is associated with the previously-created first user account. Based on this determination, the account association component 116 may suggest settings, content items, user accounts, or the like to transfer from the first user account to the second user account as the second user account is being created. For instance, the account association component 116 may suggest content items, such as feed posts, collections, ephemeral content items, and so forth to copy from the first user account to pre-populate the second user account when the second user account is created. The account association component 116 may receive a selection from the user 102(1) of a content item previously shared by the first user account to copy to the second user account, and copy the selected content item to the second user account. In this way, the second user account may have at least one content item when created by the account creation component 112 and shared via the social networking system 106 with the users 102(2)-102(n).

Additionally, in some cases, the account association component 116 may suggest user accounts associated with the users 102(2)-102(n) to follow during creation of the second user account. As used herein, a "follow" represents a user account that chooses to see posts and content shared by another user account in the content feed of the following user account. For example, the account association component 116 may determine user accounts associated with the users 102(2)-102(n) that the first user account follows on the social networking system 106.

The account association component 116 may then provide suggestions of one or more of the user accounts associated with the users 102(2)-102(n) followed by the first user account as accounts for the second user account to follow as well. In some cases, the account association component 116 may suggest user accounts that are unassociated with the unique identifier of the user 102(1), e.g., are associated with unique identifiers provided by the users 102(2)-102(n) to create user accounts on the social networking system 106. However, examples are considered in which the account association component 116 suggests a user account that is associated with the unique identifier of the user 102(1) to follow as well. The account association component 116 may receive a selection of a user account of one of the users 102(2)-102(n) followed by the first user account to also be followed by the second user account as part of the creation of the second user account. When the account creation component 112 creates the second user account, the second user account will follow the user account(s) 102(2)-102(n) based on receiving the selection.

At operation 122 (indicated by "5"), the social networking system 106 provides the first user account and the second user account with access to social network functionality. For example, the social networking system 106 may provide the first user account with functionality to view content items shared by a first group of user accounts that the first user account follows on the social networking system 106. The social networking system 106 may also provide the second user account with functionality to view content items shared by a second, different group of user accounts than the first group of user accounts that the second user account follows on the social networking system 106 (although in examples, the first group of user accounts may share one or more user accounts with the second group of user accounts). Other functionality is also contemplated to be provided by the social networking system 106 to the first user account and the second user account, such as messaging with the users 102(2)-102(n), searching for content, and so forth.

At operation 124 (indicated by "6"), the social networking system 106 outputs content from the first user account and the second user account to other user account(s). For instance, the first user account and the second user account may each separately share feed media, reel media, feedback on content items shared by other user accounts, and the like. In some examples, activities performed by the first user account on the social networking system 106 are indicated by the username assigned to the first user account, and activities performed by the second user account on the social networking system 106 are indicated by the username assigned to the second user account. The social networking system 106 may provide a user interface to the user 102(1) that displays selectable controls associated with the first user account and the second user account (e.g., represented by the first username and the second username, respectively) when logging in to the social network application and/or logging in to the social networking system in a web browser, so that the user 102(1) can select which account to access social network functionality with.

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2C:
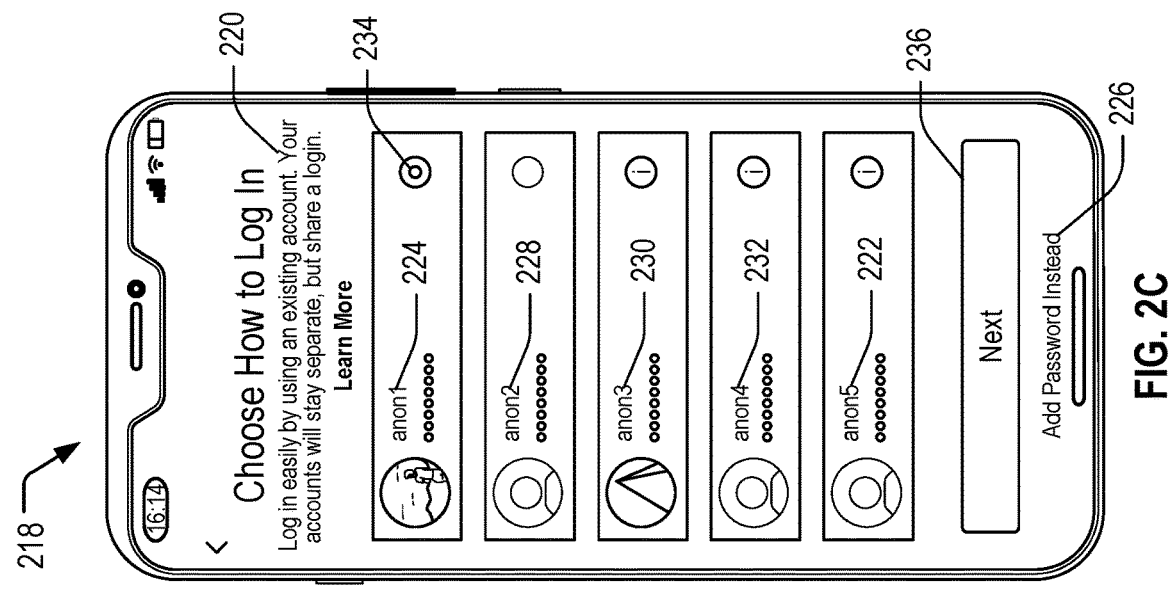
FIGS. 2A-2C depict example user interfaces that are usable to create a secondary account on a social networking system using the techniques described herein.
Figure 2B:
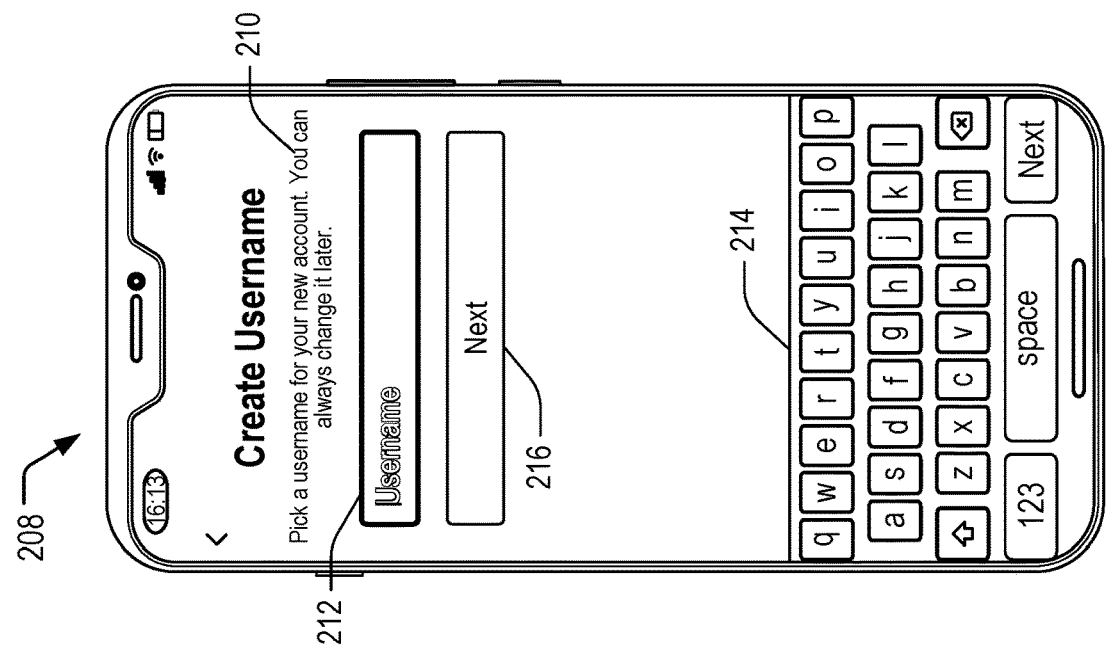
Figure 2A:
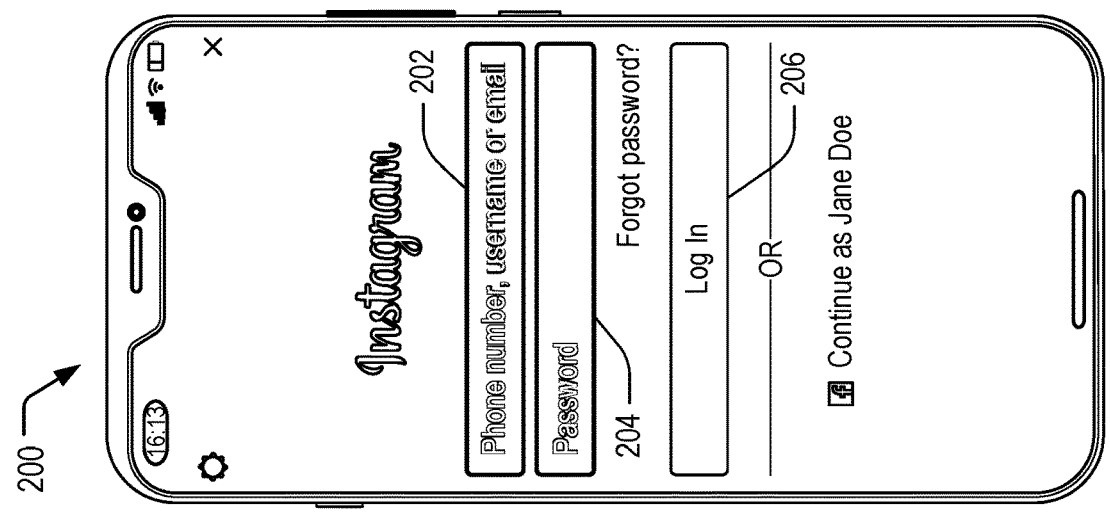

FIGS. 2A-2C depict example user interfaces that are usable to create a secondary account on a social networking system using the techniques described herein. For example, FIG. 2A illustrates a user interface 200 that may be presented to the user 102(1) on the computing device 104(1) of FIG. 1 to log in to the social networking system 106. In some cases, the user interface 200 may be presented in response to opening a social networking application on the device 104(1), in response to accessing a website associated with the social network application, in response to a selection by the user 102(1) of a control to create a secondary user account in a settings menu of a social network application, in response to selection of a control provided as part of a suggestion by the social networking system 106 to create a secondary user account (as described in relation to FIGS. 5-7), and so forth.

In some examples, the user interface 200 includes a field 202 that allows the user 102(1) to enter a username for a user account (e.g., a first user account) and/or a unique identifier associated with the user 102(1) and with the first user account created by the user 102(1). The user interface 200 may also include a field 204 that allows the user 102(1) to enter a password associated with the first user account on the social networking system 106. Additionally, the user interface 200 may include a control 206 that, when selected, submits entries in the fields 202 and 204 to be validated by the social networking system 106 to log in to the social networking system 106 and access functionality, including creation of a secondary user account. The user interface 200 may provide functionality for a single log-in to one or multiple user accounts created by the user 102(1) and associated with a single unique identifier.

FIG. 2B illustrates a user interface 208 that may be presented to the user 102(1) on the computing device 104(1) of FIG. 1 in response to a successful log in using a username or unique identifier entered in the field 202 and password entered in the field 204. In examples, the user interface 208 includes instructions 210 for creating a username for a secondary account to be associated with a unique identifier. Additionally, the user interface 208 may include a field 212 that allows the user 102(1) to enter a username for the secondary user account using a keyboard 214 in the user interface 208, and a control 216 that, when selected, submits the username to the social networking system 106 be associated with the secondary user account.

FIG. 2C illustrates a user interface 218 that may be presented to the user 102(1) on the computing device 104(1) of FIG. 1 in response to selection of the control 216. The user interface 218 may include information 220 indicating that a secondary user account 222 associated with a username entered in the field 212 may share a log-in with a primary user account 224 (e.g., a first user account created by the user 102(1)), if the user 102(1) chooses to do so. In some cases, the user interface 218 may include a control 226 that, when selected, allows the user 102(1) to add a different password for the secondary user account 222 than the password used for the primary user account 224. Despite having different passwords to log in, the primary user account 224 and the secondary user account 222 may both be associated with a common unique identifier for the user 102(1). As illustrated in the user interface 218, multiple secondary user accounts 228, 230, and 232 may be associated with a single unique identifier for the user 102(1), in addition to the primary user account 224 and the secondary user account 222.

The user interface 218 may also include an indicator 234 that corresponds to which of the user accounts 222, 224, 228, 230, and 232 will be opened for interaction via the social networking system 106 upon the user 102(1) logging in to the social network application (or logging in to the social networking system on a web browser) using the unique identifier associated with the multiple user accounts. Once logged in, the user 102(1) may switch between the user accounts 222, 224, 228, 230, and 232 without having to enter a username or the unique identifier and password again. The user interface 218 may further provide a control 236 that, when selected, submits the settings entered by the user 102(1) to the social networking system 106 for how the user 102(1) wants to control the user accounts 222, 224, 228, 230, and 232.

Figure 3A:
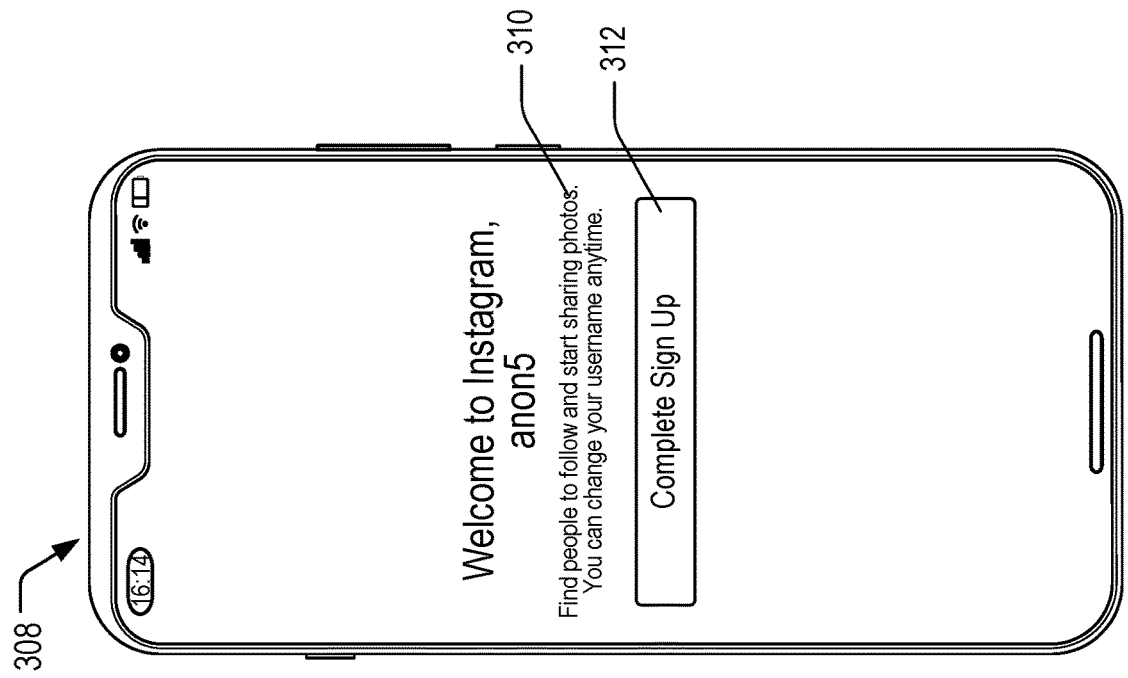
FIGS. 3A and 3B depict example user interfaces that are usable to provide information to a user during creation of a secondary account on a social networking system using the techniques described herein.
Figure 3B:
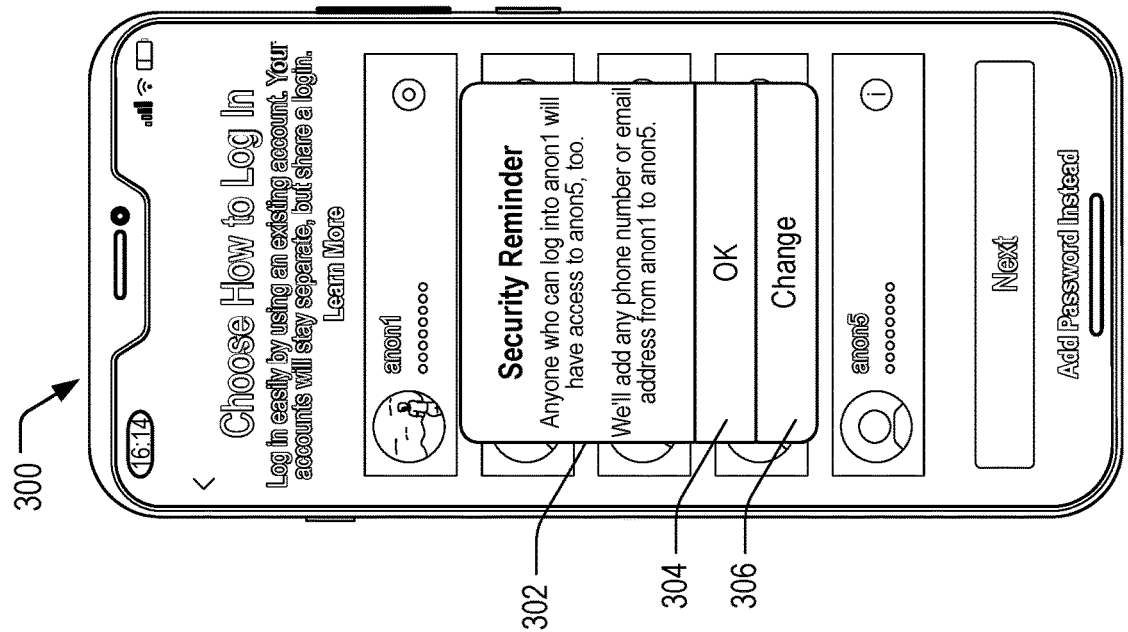

FIGS. 3A and 3B depict example user interfaces that are usable to provide information to a user during creation of a secondary account on a social networking system using the techniques described herein. For example, FIG. 3A illustrates a user interface 300 that may be presented to the user 102(1) on the computing device 104(1) of FIG. 1 in response to selection of the control 236 of FIG. 2C. The user interface 300 includes a notification 302 indicating that based on settings submitted with selection of the control 236, logging into the primary user account 224 will enable access to the secondary user account 222 as well. In examples, the notification 302 further indicates that the unique identifier associated with the primary user account 224 will also be associated with the secondary user account 222. The notification 302 may include a control 304 that confirms the settings for the secondary user account 222, and/or a control 306 to change the settings for the secondary user account 222. Selection of the control 306 may cause the social network application or web browser to return to the user interface 218.

In some examples, selection of the control 304 may cause a user interface 308 to be presented to the user 102(1) on the computing device 104(1). The user interface 308 may include information 310 indicating that the secondary user account 222 is activated on the social networking system 106, such as with the settings selected in accordance with the user interface 218. In examples, the user interface 308 may include a control 312 that, when selected, allows the user 102(1) to perform activities such as selecting user accounts to follow by the secondary user account 222, sharing content by the secondary user account 222, interacting with other users 102(2)-102(n) on the social networking system using feedback or messaging functionality, and the like. In some cases, selection of the control 312 may cause the social network application or web browser to present suggestions of content to copy from the primary user account 224 to the secondary user account 222, and/or present suggestions of other user accounts followed by the primary user account 224 for the secondary user account 222 to follow, as discussed above.

FIGS. 4-7 illustrates processes for secondary account creation on a social networking system using the techniques described herein. Various methods are described with reference to the example system of FIG. 1 and/or the user interfaces of FIGS. 2A-3B for convenience and ease of understanding. However, the methods described are not limited to being performed using the systems of FIG. 1 or FIG. 8 and/or the user interfaces of FIGS. 2A-3B, and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

Figure 4:
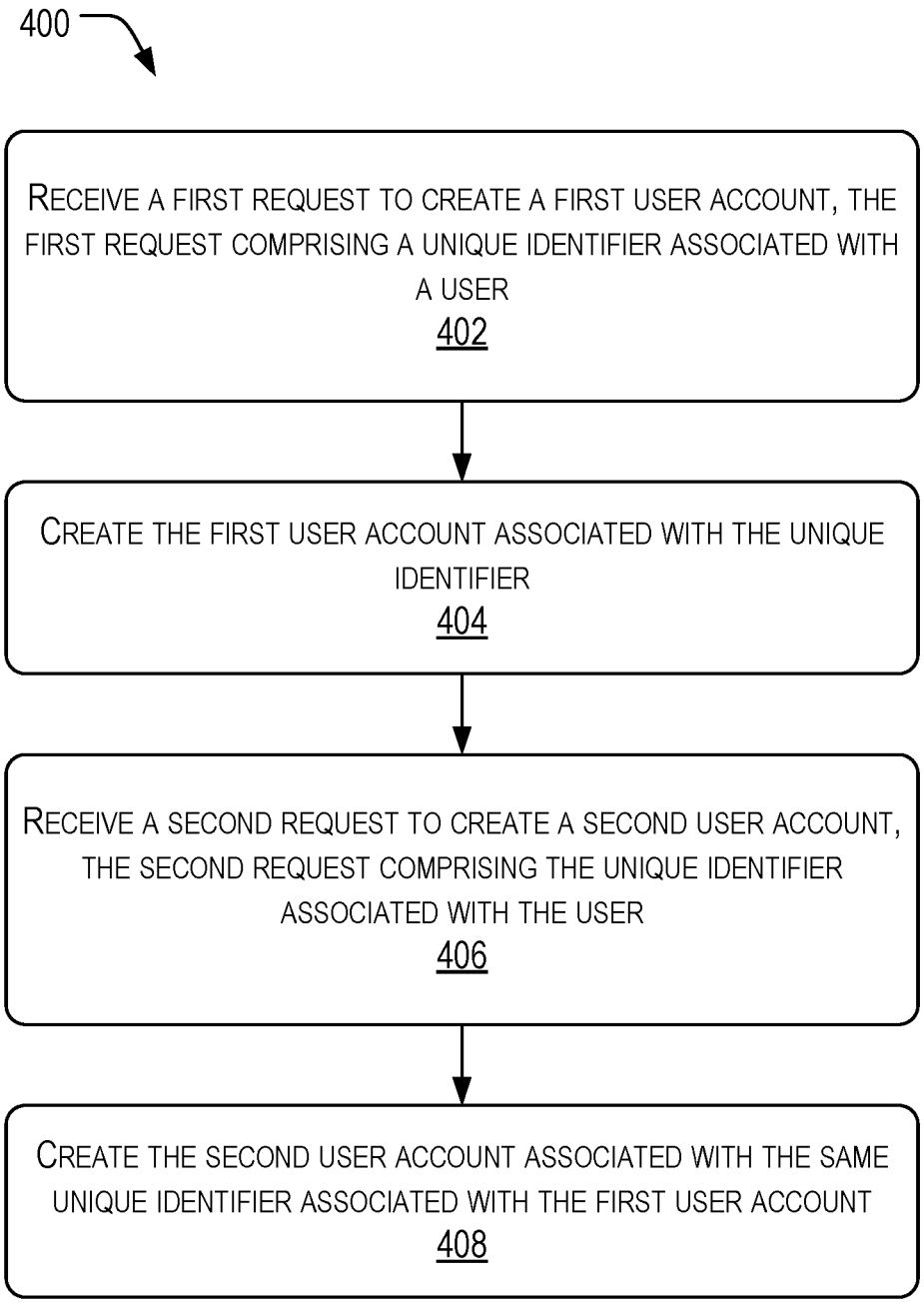
FIG. 4 illustrates a flowchart outlining an example method to generate a secondary account on a social networking system using the techniques described herein.

FIG. 4 illustrates an example process 400 to generate a secondary account on a social networking system using the techniques described herein. An operation 402 includes receiving a first request to create a first user account, where the first request comprises a unique identifier associated with a user. For instance, the unique identifier may be a name, email address, phone number, driver's license number, mailing address, internet protocol (IP) address, or the like that identifies the user 102(1) as being a different user than the users 102(2)-102(n).

An operation 404 includes creating the first user account associated with the unique identifier. For instance, the account association component 116 associates a unique identifier, such as an email address, included in the request with the first user account. The account association component 116 may also, in some cases, send a verification email to the email address included in the first request that verifies that the first user account has been successfully created.

An operation 406 includes receiving a second request to create a second user account, where the second request comprises the unique identifier associated with the user. For example, the second request includes a same name, email address, phone number, driver's license number, mailing address, internet protocol (IP) address, or the like that identifies the user 102(1) in some way, and differentiates the user 102(1) from other users 102(2)-102(n), that was included in the first request.

An operation 408 includes creating the second user account associated with the same unique identifier that was associated with the first user account. In some examples, the account association component 116 associates the unique identifier with the second user account in addition to associating the unique identifier with the first user account. For instance, the account association component 116 associates the unique identifier of the email address with the second user account to accompany the first user account associated with the email address. The account association component 116 may also, in some cases, send a verification email to the email address included in the second request that verifies that the second user account has been successfully created.

Figure 5:
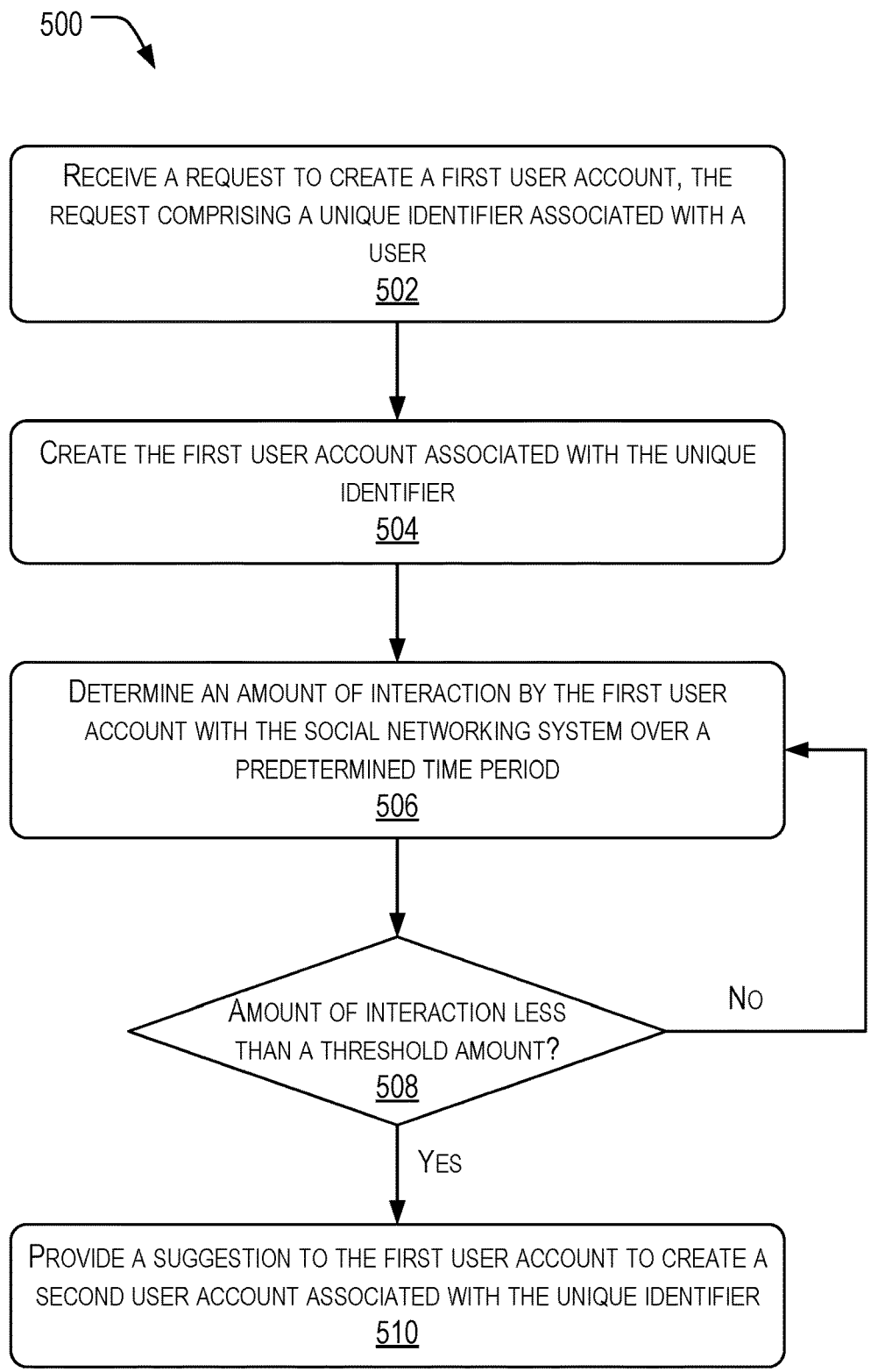
FIG. 5 illustrates a flowchart outlining an example method to suggest creation of a secondary account on a social networking system based on an amount of user interaction with a first user account using the techniques described herein.

FIG. 5 illustrates an example process 500 to suggest creation of a secondary account on a social networking system based on an amount of user interaction with a first user account using the techniques described herein.

An operation 502 includes receiving a request to create a first user account, where the request comprises a unique identifier associated with the user. Similar to the discussion above, the unique identifier may be a name, email address, phone number, driver's license number, mailing address, internet protocol (IP) address, or the like that identifies the user 102(1) as being a different user than the users 102(2)-102(n).

An operation 504 includes creating the first user account associated with the unique identifier. As described above, the account association component 116 associates a unique identifier, such as an email address, included in the request with the first user account.

An operation 506 includes determining an amount of interaction by the first user account with the social networking system over a predetermined time period. The amount of interaction may correspond to one or more of a number of times the user 102(1) accessed a social network application associated with the social networking system 106 and/or the social networking system via a web browser, an amount of time the user 102(1) used the social network application, a number of content items shared via the social networking system by the user 102(1), a number of times the user 102(1) provided feedback (likes, comments, messages, etc.) on the social networking system 106, and so on. The predetermined amount of time may be one hour, one day, one week, two weeks, one month, two months, and so forth.

An operation 508 includes determining whether the amount of interaction by the first user account with the social networking system is less than a threshold amount for the predetermined time period. For example, the threshold may correspond to using the social network application for thirty minutes over the predetermined time period of one week. In another example, the threshold may correspond to sharing five content items on the social networking system 106 over the predetermined time period of one month.

If the amount of interaction by the first user account with the social networking system is less than the threshold amount, the process 500 may proceed to an operation 510, that includes providing a suggestion to the first user account to create a second user account associated with the unique identifier. Continuing with the example above, if the user 102(1) has used the social network application with the first user account for less than thirty minutes over the predetermined time period of one week, the social networking system 106 may provide a suggestion to the first user account to create a second user account. In another example, if the user 102(1) has shared fewer than five content items on the social networking system 106 over the predetermined time period of one month, the social networking system 106 may provide a suggestion to the first user account to create a second user account. In this way, the social networking system 106 may encourage more interaction by the user 102(1) on the social networking system 106 by suggesting the creation of a secondary user account.

Alternatively, if the amount of interaction by the first user account with the social networking system is greater than the threshold amount, the process 500 may return to the operation 506 and continue monitoring an amount of interaction by the first user account with the social networking system. Examples are also considered in which the amount of interaction by the first user account with the social networking system being greater than a threshold amount may cause a suggestion to be provided to the first user account. This may provide an opportunity for users who are active on the social networking system 106 to share different aspects of their lives in different ways using the social networking system.

Figure 6:
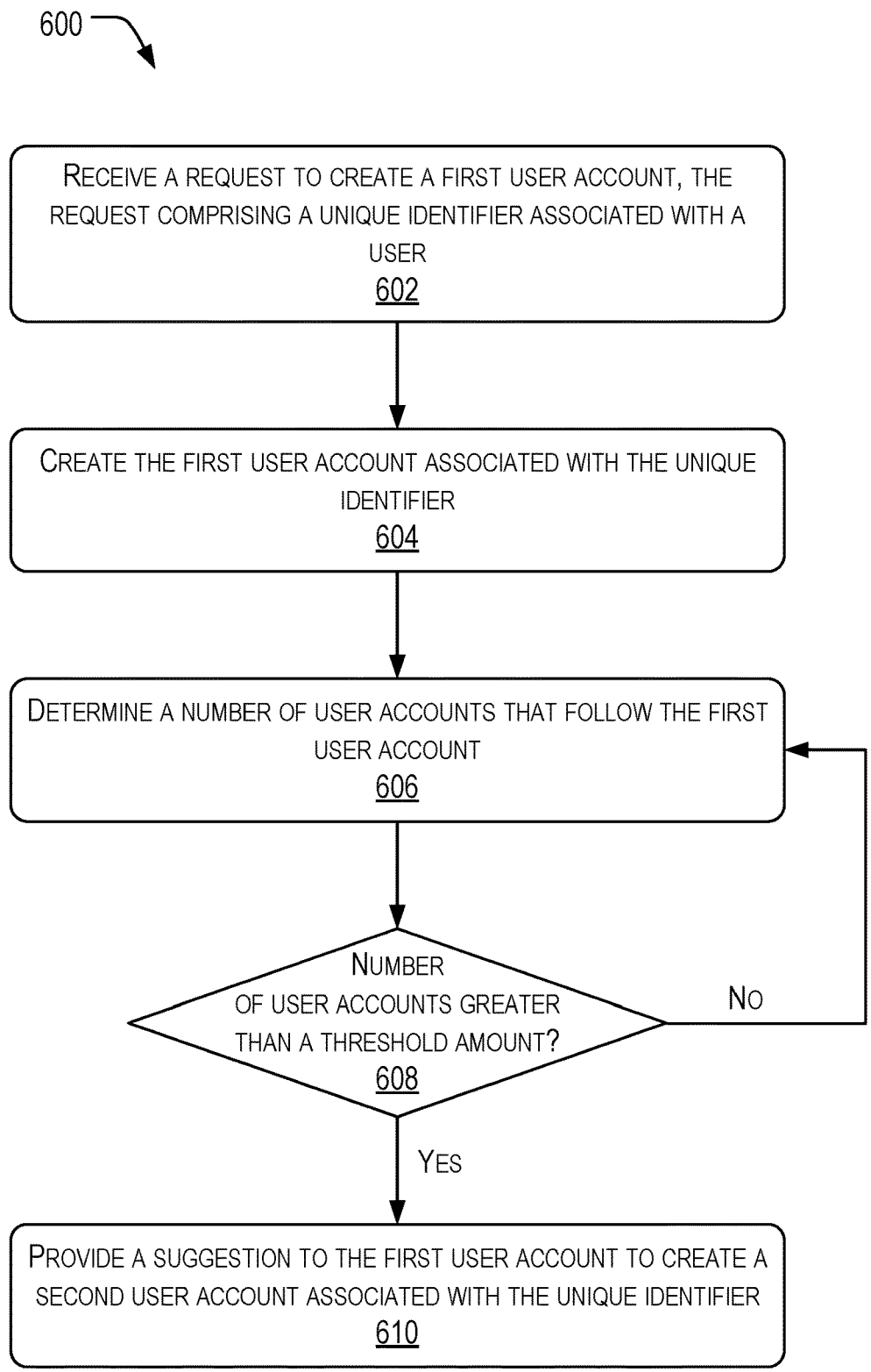
FIG. 6 illustrates a flowchart outlining an example method to suggest creation of a secondary account on a social networking system based on a number of accounts that follow a first user account using the techniques described herein.

FIG. 6 illustrates an example process 600 to suggest creation of a secondary account on a social networking system based on a number of accounts that follow a first user account using the techniques described herein.

An operation 602 includes receiving a request to create a first user account, where the request comprises a unique identifier associated with the user. Similar to the discussion above, the unique identifier may be a name, email address, phone number, driver's license number, mailing address, internet protocol (IP) address, or the like that identifies the user 102(1) as being a different user than the users 102(2)-102(n).

An operation 604 includes creating the first user account associated with the unique identifier. As described above, the account association component 116 associates a unique identifier, such as an email address, included in the request with the first user account.

An operation 606 includes determining a number of user accounts that follow the first user account on the social networking system. As noted above, a "follow" represents a user account that chooses to see posts and content shared by another user account in the content feed of the following user account. For example, the social networking system 106 may determine user accounts associated with the users 102(2)-102(n) follow the first user account on the social networking system 106.

An operation 608 includes determining whether the number of user accounts that follow the first user account is greater than a threshold amount. For example, the threshold may correspond to 100 user accounts, 500 user accounts, 1,000 user accounts, 10,000 user accounts, or some other number of user accounts that follow the first user account.

If the number of user accounts that follow the first user account is greater than the threshold amount, the process 600 may proceed to an operation 610, that includes providing a suggestion to the first user account to create a second user account associated with the unique identifier. For instance, if the social networking system 106 determines that the first user account has 1,200 followers, and the threshold number of followers is 1,000 followers, the social networking system 106 may provide a suggestion to the first user account to create a second user account. In this way, the social networking system 106 may encourage users who have a larger following, such as the user 102(1), to share more and/or different content on the social networking system 106 by suggesting the creation of a secondary user account.

Alternatively, if the number of user accounts that follow the first user account is less than the threshold amount, the process 600 may return to the operation 606 and continue monitoring a number of followers that the first user account has on the social networking system. When the first user account reaches the threshold number of followers, the social networking system 106 may then provide the suggestion to the first user account to create the second user account. Examples are also considered in which the number of followers of the first user account on the social networking system being less than a threshold amount may cause a suggestion to be provided to the first user account to create a second user account as well.

Figure 7:
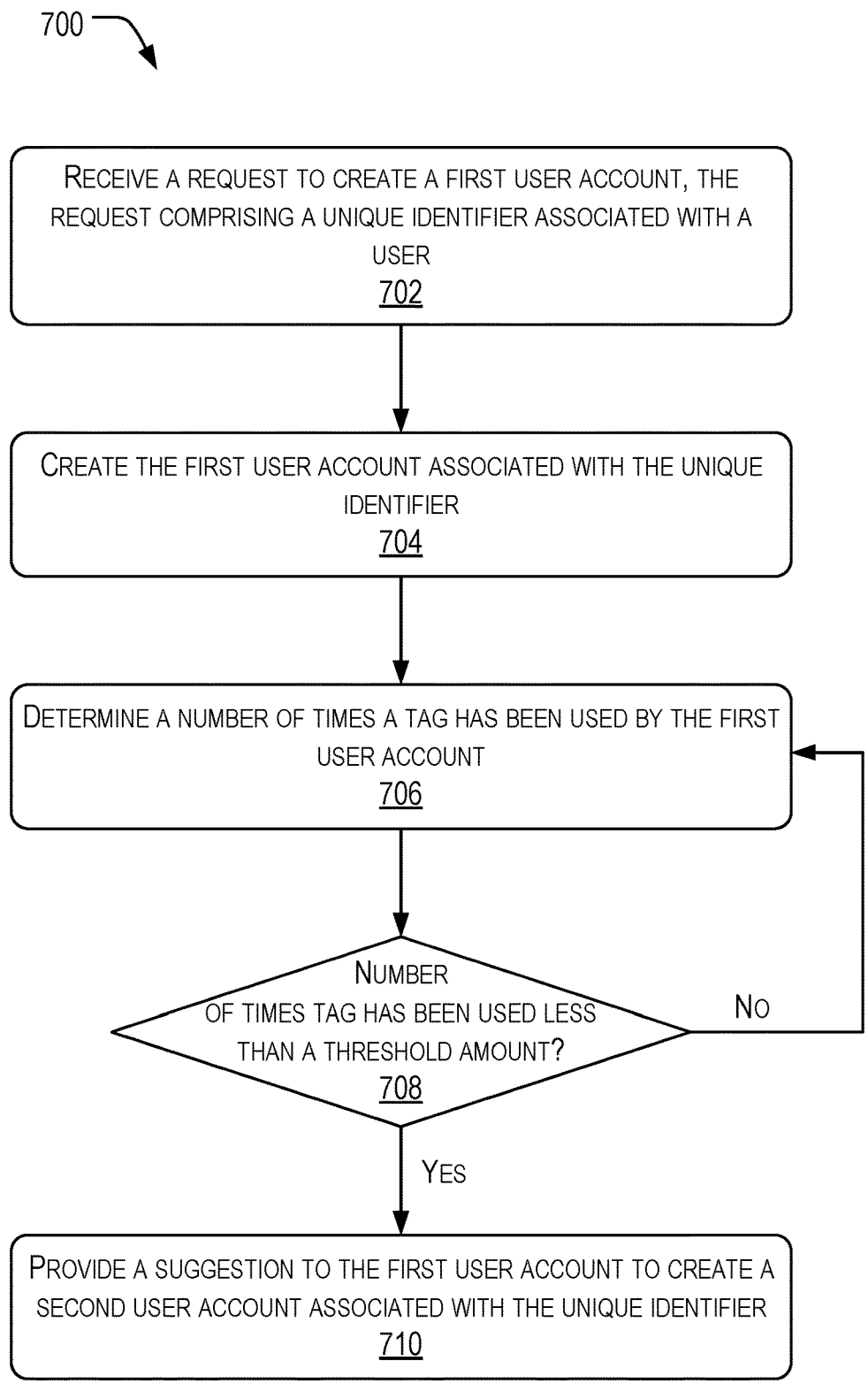
FIG. 7 illustrates a flowchart outlining an example method to suggest creation of a secondary account on a social networking system based on a number of times a tag has been used by a first user account using the techniques described herein.

FIG. 7 illustrates an example process 700 to suggest creation of a secondary account on a social networking system based on a number of times a tag has been used by a first user account using the techniques described herein.

An operation 702 includes receiving a request to create a first user account, where the request comprises a unique identifier associated with the user. Similar to the discussion above, the unique identifier may be a name, email address, phone number, driver's license number, mailing address, internet protocol (IP) address, or the like that identifies the user 102(1) as being a different user than the users 102(2)-102(n).

An operation 704 includes creating the first user account associated with the unique identifier. As described above, the account association component 116 associates a unique identifier, such as an email address, included in the request with the first user account.

An operation 706 includes determining a number of times a tag has been used by the first user account on the social networking system. For example, the tag may correspond to an indicator of participation in a multi-author story, such as by use of a hash symbol ("#") that begins a string (e.g., "#dayinthelife"). Multiple user accounts may contribute to the multi-author story by including the tag in an item of content shared on the social networking system 106. In some cases, the social networking system 106 may allow users to search tags to view content items shared by other users on the social networking system that include the tag.

An operation 708 includes determining whether the number of times the tag has been used by the first user account is greater than a threshold amount. For example, the threshold may correspond to 2 times that the first user account has used the tag, 5 times that the first user account has used the tag, 10 times that the first user account has used the tag, or some other number of times that the first user account has used the tag in different content items shared on the social networking system 106.

If the number of times that the first user account has used the tag is greater than the threshold amount, the process 700 may proceed to an operation 710, that includes providing a suggestion to the first user account to create a second user account associated with the unique identifier. For instance, if the social networking system 106 determines that the first user account has used a tag such as "#shoenerd" 8 times, and the threshold number of tags is 5 tags, the social networking system 106 may provide a suggestion to the first user account to create a second user account. In some cases, the suggestion may relate to the tag, such as by suggesting that the first user account create a second user account directed to an interest of the user 102(1) associated with the tag. Continuing with the example above, the social networking system 106 may suggest that the user 102(1) create a secondary account to provide content related to shoes in response to the first user account using the tag "#shoenerd" more than a threshold number of times. In this way, the social networking system 106 may encourage users who have a particular interest to share content related to that interest on the social networking system 106 by suggesting the creation of a secondary user account.

Alternatively, if the number of tags used by the first user account is less than the threshold amount, the process 700 may return to the operation 706 and continue monitoring a number of tags used by the first user account on the social networking system. When the first user account reaches the threshold number of tags, the social networking system 106 may then provide the suggestion to the first user account to create the second user account. Examples are also considered in which the number of tags by the first user account on the social networking system being less than a threshold amount may cause a suggestion to be provided to the first user account to create a second user account as well.

Example System and Device

Figure 8:
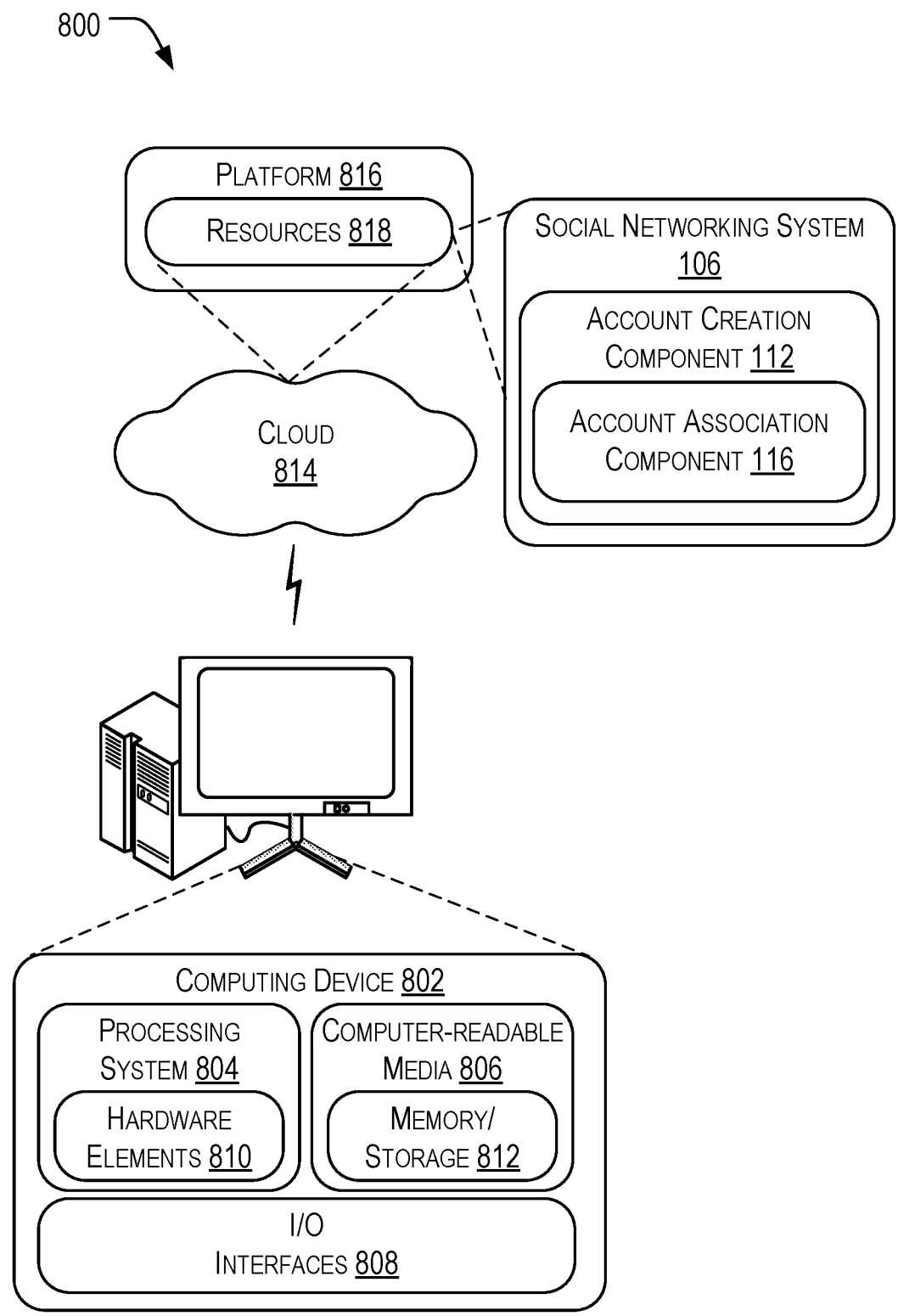
FIG. 8 is an example system and device that is usable to implement the techniques described herein.

FIG. 8 illustrates an example system generally at 800 that includes an example computing device 802 that is representative of one or more computing systems and/or devices that may implement the various techniques described herein. This is illustrated through inclusion of the account creation component 112 and the account association component 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 802. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 802, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 810 and computer-readable media 806 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also be scalable to provide a corresponding level of scale to encountered demand for the resources 818 that are implemented via the platform 816. Accordingly, in an interconnected device embodiment, implementation of functionality described herein may be distributed throughout multiple devices of the system 800. For example, the functionality may be implemented in part on the computing device 802 as well as via the platform 816 which may represent a cloud computing environment 814.

The example systems and methods of the present disclosure overcome various deficiencies of known prior art devices. Other embodiments of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    receiving, by a social networking system, a first request to create a first user account, the first request comprising a unique identifier associated with a user;
    creating, by the social networking system, the first user account associated with the unique identifier;
    providing, by the social networking system, a suggestion to the first user account to create a second user account, wherein providing the suggestion to the first user account is based at least in part on:
        an amount of interaction by the first user account with the social networking system,
        a number of user accounts that follow the first user account on the social networking system, or
        a tag used by the first user account on the social networking system;
    receiving, by the social networking system, a second request to create the second user account, the second request comprising the unique identifier associated with the user, wherein receiving the second request is based at least in part on selection of a control included in the suggestion; and
    creating, by the social networking system, the second user account associated with the unique identifier.

2. The method of claim 1, wherein the unique identifier is one or more of a phone number associated with the user or an email address associated with the user.

3. The method of claim 1, wherein the first user account has a first username and the second user account has a second username, the second username being different from the first username.

4. The method of claim 1, wherein creating the second user account comprises receiving a selection of a content item from the first user account to copy to the second user account.

5. The method of claim 1, wherein creating the second user account comprises receiving a selection of a third user account followed by the first user account to also be followed by the second user account, the third user account being unassociated with the unique identifier.

6. The method of claim 1, further comprising:
determining the amount of interaction by the first user account with the social networking system over a predetermined time period;
determining that the amount of interaction is less than a threshold amount of interaction; and
based at least in part on determining that the amount of interaction is less than the threshold amount of interaction, providing the suggestion to the first user account to create the second user account.

7. The method of claim 1, further comprising:
determining the number of user accounts that follow the first user account on the social networking system;
determining that the number of user accounts that follow the first user account is greater than a threshold number of user accounts; and
based at least in part on determining that the number of user accounts that follow the first user account is greater than the threshold number of user accounts, providing the suggestion to the first user account to create the second user account.

8. The method of claim 1, further comprising:
determining the tag used by the first user account on the social networking system;
determining that the tag has been used by the first user account less than a threshold number of times; and
based at least in part on determining that the tag has been used by the first user account less than the threshold number of times, providing the suggestion to the first user account to create the second user account.

9. A system comprising:
one or more processors; and
one or more computer-readable media storing instructions that, when executed by the one or more processors, cause the one or more processors to perform operations comprising:
receiving, by a social networking system, a first request to create a first user account, the first request comprising a unique identifier associated with a user;
creating, by the social networking system, the first user account associated with the unique identifier;
providing, by the social networking system, a suggestion to the first user account to create a second user account, wherein providing the suggestion to the first user account is based at least in part on:
an amount of interaction by the first user account with the social networking system,
a number of user accounts that follow the first user account on the social networking system, or
a tag used by the first user account on the social networking system;
receiving, by the social networking system, a second request to create a second user account, the second request comprising the unique identifier associated with the user, wherein receiving the second request is based at least in part on selection of a control included in the suggestion; and
creating, by the social networking system, the second user account associated with the unique identifier.

10. The system of claim 9, wherein the unique identifier is one or more of a phone number associated with the user or an email address associated with the user.

11. The system of claim 9, wherein the first user account has a first username and the second user account has a second username, the second username being different from the first username.

12. The system of claim 9, wherein creating the second user account comprises receiving a selection of a content item from the first user account to copy to the second user account.

13. The system of claim 9, the operations further comprising:
determining the amount of interaction by the first user account with the social networking system over a predetermined time period;
determining that the amount of interaction is less than a threshold amount of interaction; and
based at least in part on determining that the amount of interaction is less than the threshold amount of interaction, providing the suggestion to the first user account to create the second user account.

14. The system of claim 9, the operations further comprising:
determining the number of user accounts that follow the first user account on the social networking system;
determining that the number of user accounts that follow the first user account is greater than a threshold number of user accounts; and
based at least in part on determining that the number of user accounts that follow the first user account is greater than the threshold number of user accounts, providing the suggestion to the first user account to create the second user account.

15. The system of claim 9, the operations further comprising:
determining the tag used by the first user account on the social networking system;
determining that the tag has been used by the first user account less than a threshold number of times; and
based at least in part on determining that the tag has been used by the first user account less than the threshold number of times, providing the suggestion to the first user account to create the second user account.

16. One or more computer-readable media storing instructions that, when executed by one or more processors, cause the one or more processors to perform operations comprising:
receiving, by a social networking system, a first request to create a first user account, the first request comprising a unique identifier associated with a user;
creating, by the social networking system, the first user account associated with the unique identifier;
providing, by the social networking system, a suggestion to the first user account to create a second user account, wherein providing the suggestion to the first user account is based at least in part on:
an amount of interaction by the first user account with the social networking system,
a number of user accounts that follow the first user account on the social networking system, or
a tag used by the first user account on the social networking system;
receiving, by the social networking system, a second request to create a second user account, the second request comprising the unique identifier associated with the user, wherein receiving the second request is based at least in part on selection of a control included in the suggestion; and
creating, by the social networking system, the second user account associated with the unique identifier.

17. The one or more computer-readable media of claim 16, wherein creating the second user account comprises receiving a selection of a third user account followed by the first user account to also be followed by the second user account, the third user account being unassociated with the unique identifier.

18. The one or more computer-readable media of claim 16, the operations further comprising:
   determining the amount of interaction by the first user account with the social networking system over a predetermined time period;
   determining that the amount of interaction is less than a threshold amount of interaction; and
   based at least in part on determining that the amount of interaction is less than the threshold amount of interaction, providing the suggestion to the first user account to create the second user account.

19. The one or more computer-readable media of claim 16, the operations further comprising:
   determining the number of user accounts that follow the first user account on the social networking system;
   determining that the number of user accounts that follow the first user account is greater than a threshold number of user accounts; and
   based at least in part on determining that the number of user accounts that follow the first user account is greater than the threshold number of user accounts, providing the suggestion to the first user account to create the second user account.

20. The one or more computer-readable media of claim 16, the operations further comprising:
   determining the tag used by the first user account on the social networking system;
   determining that the tag has been used by the first user account less than a threshold number of times; and
   based at least in part on determining that the tag has been used by the first user account less than the threshold number of times, providing the suggestion to the first user account to create the second user account.

* * * * *